March 22, 1966 R. I. BATISTA ETAL 3,241,230
DIFFUSION BONDING OF TUNGSTEN TO TUNGSTEN
Filed Oct. 12, 1962
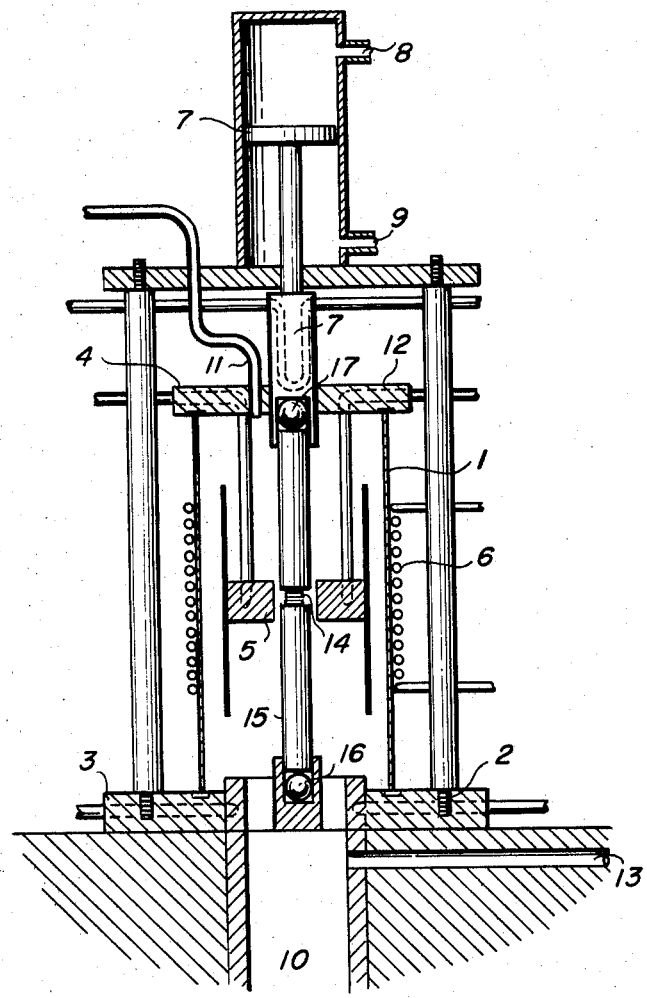
INVENTORS
Roy I. Batista
Gale S. Hanks
Daniel J. Murphy
BY

United States Patent Office

3,241,230
Patented Mar. 22, 1966

3,241,230
DIFFUSION BONDING OF TUNGSTEN TO
TUNGSTEN
Roy I. Batista and Gale S. Hanks, Los Alamos, N. Mex., and Daniel J. Murphy, Tucson, Ariz., assignors to the United States of America as represented by the United States Atomic Energy Commission
Filed Oct. 12, 1962, Ser. No. 230,303
16 Claims. (Cl. 29—494)

The invention described herein was made in the course of, or under, a contract with the U.S. Atomic Energy Commission.

This invention relates to a method of bonding metal parts and, more particularly, to a method of joining tungsten to tungsten through the use of elevated temperature diffusion bonding under pressure.

Performance requirements for materials at elevated temperatures have drawn increasing attention to tungsten which resists melting up to 3410° C., the highest melting point of any of the metal elements. The results reported in the areas of brazing and welding of tungsten show steady advances over formidable metallurgical and environmental difficulties. There are applications, however, in which fusion bonding is impractical and in which solid state diffusion bonding may provide the most appropriate method of effecting a metallurgical bond where tungsten metal parts are involved. This is the case, for example, in the joining of tungsten parts where said tungsten parts are to be used in fuel element assemblies for nuclear reactors. Prior studies of diffusion bondings seem to have been on a relatively small scale and relate to lower melting point metals such as copper. With these low melting systems, interfacial additions are not used to provide a practical method of bonding. Studies of the joining of high melting point metals seem to have been confined to fusion bonding.

According to the invention, solid state diffusion bonding of tungsten to tungsten is conducted by varying the temperature, time, axial pressure, environment, and interfacial additions between the tungsten surfaces to be bonded. Various interfacial coatings were employed to promote diffusion including graphite, oxide and metal slurries, electroplates, direct surface oxidation, and Mo-W deposits from carbonyl decomposition. Of the above interfacial additions it has been found that direct surface oxidation and Mo-W deposit from carbonyl decomposition yield far superior results than do the other coatings. Any axial pressure applied to the tungsten surfaces to be bonded yield beneficial results but, for best results, pressures of above about 1000 p.s.i. are used. The maximum limit of axial pressure is that pressure at which deformation begins. Two types of environment were used, hydrogen and vacuum. The vacuum may be used for other than oxide coatings, but hydrogen is preferred in all cases in view of its cleaning action. The temperatures and time used in this method are related in that the longer the time, the lower the temperature that can be used in the diffusion bonding process. For example, the time of two hours requires a temperature above about 2000° C., where as if this time is extended to a period of six hours a temperature of 1700° C. has been found suitable. By the practice of the method of this invention tensile strengths of about 30,000 p.s.i. may be obtained and this compares with about 58,700 for the solid tungsten bar used for bonding. Powder compacted tungsten sheet containing 50 volume percent uranium oxide, spray coated with an outer layer of tungsten, bonds thoroughly to itself and to tungsten metal under diffusion treatments of 2000° C. and moderate pressures of the order of 1000 p.s.i. Here again any axial pressure is beneficial and the maximum pressure is limited only by deformation.

Accordingly, it is an object of this invention to provide a method of bonding tungsten to tungsten so that a thorough metallurgical bond is obtained.

It is another object of this invention to provide a diffusion method of bonding whereby specimens of high tensile strength are obtained.

It is a further object of this invention to provide a comparatively simple method to attain the above goals.

Further objects will be apparent to a man skilled in the art from the following detailed description and drawing.

In order to facilitate understanding of the apparatus used to practice the method of this invention, attention is drawn to the single figure.

The figure is a schematic diagram in cross section of an environmental chamber providing high temperatures and axial pressure to tungsten specimens.

The apparatus of the figure provides high temperatures while axial pressure may be maintained normal to the interface to be bonded. A quartz tube 1 which is 100 mm. in diameter by 15 inches in length forms the evacuable chamber. The tube rests on a silicone rubber O-ring 2 which is countersunk in a water cooled brass base 3. A water cooled brass top flange 4, likewise containing an O-ring, seals the chamber and also suspends a longitudinally-split water-cooled copper induction concentrator 5 within the quartz tube. A 25-turn copper induction coil 6 surrounds the concentrator outside the quartz tube and is powered by a 25 kw., 450 kc. induction generator (not shown). This induces sufficient heat energy in a matter of minutes to maintain specimen interfaces at temperatures as high as 2600° C., as measured with an optical pyrometer. Axial loading, up to 150 pounds, may be provided by the water cooled end of the piston 7 of an air compression jack actuated by 50 p.s.i. air pressure. Compressed air may be forced in or out of ports 8 and 9 so that the jack is double acting. This enables convenient up and down movement of the piston for the emplacement of specimens. The environmental chamber (inside quartz tube 1) may be evacuated by an auxiliary vacuum system placed below exit 10 and filled with hydrogen or inert gas through an inlet 11 at the top flange 12. Sufficient hydrogen was introduced to attain atmospheric pressure. When the environment for the diffusion bonding was to be a vacuum, the chamber was evacuated to about .03$\mu$, said value not being critical. Hydrogen may be moved through the exit 13 below the bottom flange where the outflow may be burned safely in a flame jet (not shown). Disc specimens 14 tack-cemented at their periphery to prevent misalignment were placed on the lower tungsten platform 15. A light coating of thoria slurry may be applied to platform surfaces to prevent sticking. For 3-inch long tensile specimens the platforms may be modified to accommodate a longer specimen length and ball joints 16, 17 may be included to insure vertical alignment. The 3-inch long tensile specimens may be taped together to insure alignment during insertion. The apparatus used to practice the method of this invention does not form a part of this invention.

After individual bonding of a particular specimen pair had been accomplished, an additional diffusion heat treatment was given, in some instances, to groups of such diffusion bonded specimens. This was done in a large vacuum induction furnace. The specimens were placed within a tungsten susceptor inside the induction coil. No further axial pressure was applied to the specimens since they had already been bonded in the previous treatment.

Several types of specimens may be used in practicing the method of this invention. For instance, in the specific embodiments discs, rods, and wire were used. For most of the embodiments a pair of tungsten discs ⅜ inch in diameter by ⅛ inch in thickness were used. The discs were cut from swaged tungsten rod. The quality of these bonds were determined by a standard micro-examination technique. When the quality of the bond was determined by tensile testing, the discs were replaced by 3-inch rods of ⅜ inch diameter. In some cases, a flattened ¹⁄₃₂ inch diameter tungsten wire was used between ⅜ inch diameter discs or between tungsten sheet ¹⁄₁₆ inch in thickness. The sheet form was particularly adaptable for powder compacted mixtures of tungsten and uranium oxide. It is clear that the specimens used are for illustration only, the invention not being limited by the size or shape of specimens.

The quality of the diffusion bonds formed varied with the conditions imposed. Conditions of axial pressure, temperature, time at temperature, and environment were sought which would result in the formation of acceptable bonds. The best indication of the nature of W solid state diffusion achieved in a particular bonding run was obtained from a micro-examination of the cross section of a bonded specimen pair. The method employed in each individual trial consisted of applying to the opposing surfaces of tungsten specimens a thin layer, of the order of 0.00006 to .002 inch, of an interfacial material. Table I lists the coatings which were used and the method employed to deposit them.

TABLE I.—COATINGS APPLIED TO TUNGSTEN SPECIMENS

| Surface coat | Method of application |
| --- | --- |
| Electroplated: | |
| Ni | Ni plate 0.00006 in. thick from electrolytic bath. |
| Ni-Re | Ni and Re plates 0.00005 in. thick from electrolytic bath. |
| Graphite: | |
| Commercial | C coating resulted from dipping into graphite slurry. |
| Spectrographic | Do. |
| Metal slurry: | |
| Mo | Mo powder suspension sprayed on. |
| W | W powder suspension sprayed on. |
| W+0.5% C | Suspension of W and C powder mixture sprayed on. |
| W+1.0% C | Do. |
| Oxide slurry: | |
| $WO_3$ | $WO_3$ powder suspension sprayed on. |
| $WO_3$, 90% | } $WO_3$-$MoO_3$ powder suspension sprayed on. |
| $MoO_3$, 10% | |
| Direct oxidation: | |
| From oxy-acetylene torch. | $WO_3$ formed on W surface from torch heat, in air. |
| From ⅓$O_2$+⅔He mix. | $WO_3$ formed on W surface from 1,000° C. furnace heat, under He-$O_2$. |
| Carbonyl: | |
| Mo (CO)$_6$ | ⎱ Mo, W, and Mo+W deposited upon contact of outgassed heated specimens with respective carbonyls at thermal decomposition temperature of 250° C. under 30 mm. pressure. |
| W (CO)$_6$ | |
| Mo (CO)$_6$, 50% | |
| W (CO)$_6$, 50% | |

*Example 1*

In this example the interfacial addition consisted of a nickel plate 0.00006 inch thick deposited from an electrolytic bath. The tungsten discs were treated at 2000° C. for two hours in a hydrogen atmosphere under 1400 p.s.i. pressure. Although bonding was complete and grain growth was observed across the interface, non-uniform grain size and the possibility of weakness at high temperature due to nickel richness in the bonded region detract from the bond formed.

*Example 2*

In this case the interfacial surface of tungsten discs were coated with graphite by dipping into a graphite slurry. The discs were then treated at 2350° C. for two hours in hydrogen under 1400 p.s.i. pressure in the apparatus of FIGURE 1. Fair uniformity exists in the size of the grain through the bonded region but incomplete diffusion of graphite in the interface was found. Many inclusions remained at the interface.

*Example 3*

In this embodiment tungsten discs were spray coated with a powder suspension of tungsten slurry. The discs were then exposed to a temperature of 2300° C. for one and one-half hours in hydrogen under 600 p.s.i. pressure. Diffusion and grain growth occurred across the interface, but again many inclusions remained.

*Example 4*

Tungsten discs were spray coated with a $WO_3$ powder suspension. They were then treated at 2350° C. for one hour in vacuum and for two hours in hydrogen at 1400 p.s.i. pressure. This treatment resulted in a clean interface and uniformly sized grains in an early stage of interlocking growth. Very little unreduced oxides remain. It appears that a longer diffusion treatment would be needed to develop this bond.

The general experience with slurry coating indicated that the porous layer of deposited particles which adhered to the tungsten surface after evaporation of the vehicle was not fully compacted by the application of pressure during the diffusion treatment.

It was therefore desired to attain a more natural build-up of an oxide coating on the tungsten surface than that obtained by the more mechanical application of the slurry method. The technique of direct oxidation of the specimen itself was employed. This was accomplished by exposure to oxygen while at elevated temperatures.

*Example 5*

$WO_3$ was formed on the interfacial surface of tungsten discs by torch heat in air utilizing an oxyacetylene torch. The discs were then treated at 2350° C. for two hours in hydrogen under 1400 p.s.i. pressure. Some diffusion occurred and some grain growth was observed across the interface. However, unreduced oxides remained and the bond produced was not of optimum quality.

*Example 6*

In this embodiment a variation of the direct oxidation procedure was employed. Here specimens were heated to 1000° C. in helium which was then displaced by a mixture of ⅓ oxygen and ⅔ helium for two minutes. After a diffusion treatment at 2350° C. for two hours in hydrogen under 1400 p.s.i. pressure, complete bonding was obtained. The interface grains were somewhat columnar and some voids and unreduced inclusions were present but, on the whole, the method resulted in very thorough diffusion and effective growth of interlocking grains.

Some of the most promising bonds were produced by deposition of coats of molybdenum, or tungsten, or both, from the thermal decomposition of the carbonyl compounds of these metals. The carbonyl coatings were applied in a quartz tube of 25 mm. inside diameter by 18 inches long containing a dampened wool plug to which was added the required carbonyl powder. The specimen was placed in the center of the tube and after evacuation of the tube the specimen was heated to 700° C. by induction. This temperature was held for two minutes for outgassing. It was then cooled and subsequently dropped into carbonyl, or a mixture of carbonyls. The specimen was then reheated at reduced power to a temperature adequate to provide 30 mm. of pressure which was controlled with a flow meter. After a .001 inch coating had been applied the power was turned off and the furnace allowed to cool.

*Example 7*

In this embodiment tungsten discs were coated with tungsten by thermal decomposition of W(CO)$_6$. The discs were treated at 2350° C. for two hours in vacuum under a pressure of 1400 p.s.i. Bonding was complete but coarse grains and isolated voids were present.

Example 8

Tungsten discs were coated with molybdenum by thermal decomposition of $Mo(CO)_6$. The discs were treated at 2350° C. for one and one-half hours in hydrogen under a pressure of 1400 p.s.i. An especially well diffused bond was produced. Grain growth was observed across the interface, said interface being outlined by a very few residual unreduced inclusions. The thorough nature of the bonding in Example 8, if compared with the bonding of Example 7, may be related to the closer proximity of the diffusion treatment temperature to the lower melting point of the molybdenum coating as compared to the tungsten coating. Molybdenum and tungsten may be deposited together from a mixture of their carbonyls with relative facility compared to individual depositions. This relative facility seems also to be reflected in the quality of the bond formed.

Example 9

Tungsten discs were coated with molybdenum plus tungsten from a mixture of 50 percent $Mo(CO)_6$ plus 50 percent $W(CO)_6$. The discs were treated at 2350° C. for two hours in hydrogen under 1400 p.s.i. pressure and thorough bonding was observed. In the periphery of some carbonyl coated specimens a moderate degree of mushrooming and in others a frothy external appearance was observed indicating a low melting condition at the interface region. It thus appears that in the application of the coating some MoC was present during the diffusion treatment. The presence of MoC which has a melting point of approximately 2200° C. should contribute to a softening of the interface, improved surface contact, and the promotion of diffusion. These effects were observed.

Example 10

Tungsten discs were coated with Mo-W from the decomposition of a mixture of 50 percent $Mo(CO)_6$ plus 50 percent $W(CO)_6$. The discs were then treated at 2000° C. for two hours in hydrogen under 1400 p.s.i. pressure. This bond also was promoted by a mixed coating and showed an advanced state of grain growth across the interface. Incomplete diffusion was observed and this is attributed to too low a diffusion treatment temperature, in this particular case 2000° C. instead of 2350° C.

The bonding capabilities of sheet specimens compacted from powder mixtures of tungsten and uranium dioxide were of particular interest since tungsten is of interest as a base material for fuel elements in reactor design. As a standard procedure all sheet compacts of tungsten and uranium dioxide were coated with tungsten powder and sintered. The purpose of this coating is to prevent loss of the uranium oxide at elevated temperatures. In the course of the diffusion treatments adherence of the tungsten coat to the sheet compact received the added benefit of the high temperature diffusion treatment of the tungsten coatings. The results achieved at 2000° C. demonstrate that a thorough diffusion may be obtained at a lower temperature when powder compacts are involved.

Example 11

One-sixteenth inch tungsten sheet specimens containing 50 volume percent uranium dioxide were spray coated with tungsten, sintered and re-spray coated. This assembly was treated at 2000° C. for two hours in hydrogen under 200 p.s.i. pressure. Complete diffusion between the contacting tungsten coatings completely eliminated the original interface and grain growth was observed across the interface.

Example 12

Powder compacted tungsten sheet specimens containing 50 volume percent uranium dioxide were spray coated with a mixture of tungsten plus 1 weight percent carbon and sintered. This assembly was treated at 2000° C. for two hours in hydrogen under 1400 p.s.i. pressure. Complete bonding, as in Example 11, was attained.

Example 13

Tungsten sheets containing 50 volume percent uranium dioxide were coated with a graphite suspension and dried. These were treated at 2000° C. for one-half hour in vacuum and one-half hour in hydrogen, at 2600° C. for one-half hour and 1700° C. for one-half hour all in vacuum under 2400 p.s.i. pressure. The higher temperature used in this embodiment accentuated the diffusion of the original interface but increased the number of undesirable voids present.

Example 14

This embodiment is a variation in the type of specimen used. Molybdenum coated wire was bonded to a compacted sheet specimen. The tungsten—50 volume percent $UO_2$ sheets were spray coated with tungsten and sintered. The tungsten wire was coated with molybdenum from $Mo(CO)_6$. The assembly was treated at 2350° C. for one and one-half hours in hydrogen under 800 p.s.i. pressure. Complete diffusion and grain growth across the interface were observed but some fine porosity near the interface remained.

Several other methods of coating were utilized which are not described in the foregoing examples. These coatings and their method of application are set forth in Tables I and II. Table II lists average values obtained from tensile tests of effectively bonded specimens.

TABLE II.—RESULTS OF TENSILE TESTS

| Coating | Diffusion treatment | Average tensile strength (p.s.i.) |
|---|---|---|
| None: Solid W Bar | 2 hours at 2350° C. in $H_2$ | 58,700 |
| 15% Ni+85% Re | ---do--- | 22,675 |
| W-oxide (He-$O_2$) | ---do--- | 30,850 |
| Mo from: ($Mo(CO)_6$) | ---do--- | 17,760 |
| Mo+W from: ($(CO)_6$+$W(CO)_6$) | ---do--- | 28,060 |
| W-oxide (He-$O_2$) | 2 hours at 2350° C. in $H_2$ / 7 hours at 2600° C. in vacuum | 17,100 |
| Mo from: ($Mo(CO)_6$) | 2 hours at 2350° C. in $H_2$ / 7 hours at 2600° C. in vacuum | 7,240 |
| Mo+W from: ($(CO)_6$+$W(CO)_6$) | 2 hours at 2350° C. in $H_2$ / 7 hours at 2600° C. in vacuum | 5,430 |

The value of 22,675 p.s.i. for Ni-Re bonded specimens indicated a fair transmission of tensile strength across such a bonded joint which should be suitable for many applications, though possibly not for those at the higher temperatures. The 30,850 p.s.i. value for furnace-oxidized specimens, though based on a smaller number of tests, represents the highest tensile average obtained. The relatively low average of 17,760 p.s.i. obtained for Mo carbonyl-coated specimens is lower than that of half of the specimens of this type tested. The scatter among individual tests is attributed to a general uneven condition and a tendency toward flaking of this coating, as applied. It is to be noted that this tendency was not observed in W coatings similarly applied. This and other indications suggest that a W coating applied by the carbonyl method promotes a more effective bond. However, the corresponding diffusion treatment would require a longer time at higher temperature.

The more uniform and adherent coat resulting from a mixture of Mo and W carbonyls is reflected in the tensile results as well as in the appearance of the microstructure, as previously discussed. The 28,060 p.s.i. value for specimens of this group is an average of very uniform test results and draws attention to the fact that tensile strengths of the order of 50 percent of that of original tungsten rod, similarly treated, can be obtained by short-time diffusion bonding.

Extension of the two-hour diffusion heat treatment at 2350° C., to include an additional seven hours at the higher temperature of 2600° C., did not result in improvement in tensile strength values. Instead, individual test valves were generally lower and their average also was lower for each of the bond types tested. It appears that the lower strengths are related to the observed coarse grain structure which resulted from the additional high temperature anneal. These observations suggest that a more effective direction for diffusion treatment to promote bond improvement and increase tensile strength lies in the area of long times at lower temperatures, certainly not higher than the original bonding temperatures.

The above discussion illustrates that a diffusion bond may be developed between separate pieces of solid tungsten under suitable conditions of temperature, pressure, time and interfacial additions.

Various degrees of bonding are promoted by coating the contact surface with an auxiliary material. In order of increasing effectiveness, the following were found to promote bonding: graphite slurry, molybdenum and tungsten oxide slurry, molybdenum and tungsten metal slurries, electroplated nickel, tungsten oxide resulting from direct surface oxidation, molybdenum, tungsten, and Mo-W deposited by thermal decomposition of carbonyl compounds. From a microstructural standpoint two types of contact surface coatings are far superior to the others. The first of these is tungsten oxide from direct surface oxidation and the second is Mo-W mixture deposited from the carbonyls of these metals. Temperatures above 2000° C. are required to promote thorough tungsten to tungsten bonding at a time of two hours. Temperatures of the order of 2350° C. for two hours when applied with suitable contact pressure are generally effective in promoting diffusion across the interface and thorough bonding of the tungsten assembly. Contact pressures of any magnitude materially promote diffusion bonding and the only limitation on their magnitude is the retention of structural form. Values on the order of above 1000 p.s.i. at temperatures of 2350° C. have contributed to thorough bonding without shape distortion.

It has also been found that powder compacted tungsten sheet containing 50 volume percent uranium dioxide, spray coated with an outer layer of tungsten, bonds thoroughly to itself and to tungsten metal under diffusion treatments of 2000° C. and moderate pressures of the order of 1000 p.s.i. The 1000 p.s.i. value is merely preferred since in this case any pressure is beneficial, being limited only by retention of structural form.

It is therefore seen that the practice of the method of this invention results in thorough metallurgical bonding of tungsten specimens under relatively simple process conditions.

It will be apparent from the detailed description that a man skilled in the art may vary the method described without departing from the spirit and scope of the invention. For example, lower temperatures may be used if a longer time at temperature is maintained. This is illustrated by the fact that 1700° C. is sufficient with a time of six hours using a molybdenum coating from carbonyl decomposition and a pressure of about 1400 p.s.i. Accordingly, the invention should only be limited by the following appended claims.

What is claimed is:

1. A method of diffusion bonding tungsten to tungsten which comprises forming a thin layer of an interfacial material at the surfaces to be contacted selected from the group consisting of $WO_3$, Mo, W, a mixture of Mo and W, C, Ni and Ni-Re, simultaneously applying an axial pressure above 1000 p.s.i. and a temperature above about 1700° C. in a hydrogen atmosphere to the tungsten surfaces for sufficient time to produce diffusion bonding without deformation of the surface.

2. The method of claim 1 wherein the interfacial addition is $WO_3$.

3. The method of claim 2 wherein the $WO_3$ is applied by direct surface oxidation.

4. The method of claim 1 wherein the interfacial addition is W.

5. The method of claim 4 wherein the tungsten is deposited by $W(CO)_6$ decomposition.

6. The method of claim 1 wherein the interfacial addition is Mo.

7. The method of claim 6 wherein the Mo is deposited by $Mo(CO)_6$ decomposition.

8. The method of claim 1 wherein the interfacial addition is a mixture of Mo and W.

9. The method of claim 8 wherein the Mo-W is deposited by decomposition of a mixture of their respective carbonyls.

10. A method of diffusion bonding tungsten to tungsten which comprises forming a thin layer of tungsten oxide at the interface of the surfaces to be contacted by direct surface oxidation, consequently applying a temperature of about 2350° C. for about two hours in hydrogen at about 1400 p.s.i. pressure.

11. A method of diffusion bonding tungsten to tungsten which comprises forming a thin layer of tungsten at the interface of the surfaces to be contacted by thermal decomposition of $W(CO)_6$ and consequently treating the assembly at about 2350° C. for about two hours in vacuum under an axial pressure of about 1400 p.s.i.

12. A method of diffusion bonding tungsten to tungsten which comprises forming a thin layer of Mo at the interface of the surfaces to be contacted by thermal decomposition of $Mo(CO)_6$ and consequently treating the assembly at about 2350° C. for about one and one-half hours in a hydrogen atmosphere under an axial pressure of about 1400 p.s.i.

13. A method of diffusion bonding tungsten to tungsten which comprises forming a thin layer of Mo-W at the interface of the surfaces to be contacted by thermal decomposition of a mixture of $W(CO)_6$ and $Mo(CO)_6$ and consequently treating the assembly at about 2350° C. for about two hours in hydrogen under an axial pressure of about 1400 p.s.i.

14. A method of diffusion bonding tungsten sheets containing uranium dioxide which comprises coating the interface with tungsten, sintering, and then simultaneously exposing the assembly to a temperature above about 2000° C. for about two hours in hydrogen under an axial pressure.

15. The method of claim 14 wherein the temperature is about 2000° C. and the pressure is about 1400 p.s.i.

16. A method of diffusion bonding tungsten sheets containing uranium dioxide which comprises coating the interface with tungsten, sintering, and then simultaneously exposing the assembly to a temperature above about 2000° C. for about two hours in vacuum under an axial pressure.

References Cited by the Examiner

UNITED STATES PATENTS

| | | |
|---|---|---|
| 898,979 | 9/1908 | Kuzel. |
| 1,220,772 | 3/1917 | Murray _____ 29—493 X |
| 1,924,528 | 8/1933 | Waltenberg. |
| 2,652,621 | 9/1953 | Nelson _____ 29—504 X |
| 2,698,913 | 1/1955 | Espersen _____ 29—493 X |
| 2,743,201 | 4/1956 | Johnson et al. |
| 2,934,820 | 5/1960 | Novak et al. _____ 29—504 X |
| 2,945,295 | 7/1960 | Feaster _____ 29—494 |
| 3,088,192 | 5/1963 | Turner _____ 29—504 X |
| 3,110,101 | 11/1963 | Kieffer et al. ____ 29—497.5 X |
| 3,170,234 | 2/1965 | Tarr _____ 29—497.5 X |

FOREIGN PATENTS

| | | |
|---|---|---|
| 874,664 | 8/1942 | France. |
| 878,208 | 1/1943 | France. |
| 824,256 | 11/1959 | Great Britain. |

JOHN F. CAMPBELL, *Primary Examiner.*